United States Patent

[11] 3,587,671

| [72] | Inventor | Ernesto Gamberini |
| | | Via Abruzzo 6/5, Bologna, Italy |
| [21] | Appl. No. | 724,034 |
| [22] | Filed | Apr. 25, 1968 |
| [45] | Patented | June 28, 1971 |
| [32] | Priority | Apr. 28, 1967 |
| [33] | | Italy |
| [31] | | 1636A/67 |

[54] MACHINE FOR DISPENSING PREDETERMINED AMOUNTS OF POWDERED OR GRANULAR PRODUCE IN CONTAINERS BY MEANS OF VOLUMETRIC DISPENSERS
3 Claims, 8 Drawing Figs.

[52] U.S. Cl.................................................. 141/67,
     141/147, 141/181, 222/168.5, 222/194, 222/309
[51] Int. Cl.......................................................... B65b 1/16
[50] Field of Search........................................... 222/162,
     168, 168.5, 221, 217, 194, 252, 254, 258, 262,
     263, 306, 379; 302/49; 141/67, 146, 147, 150,
     181; 222/309

[56] References Cited
UNITED STATES PATENTS

| 1,052,653 | 2/1913 | Crowley................. | 222/194X |
| 2,540,059 | 1/1951 | Stirn et al................ | 141/67X |
| 2,656,966 | 10/1953 | McDonough et al......... | 222/217X |
| 2,684,186 | 7/1954 | Mattos..................... | 222/252X |
| 2,932,330 | 4/1960 | Donofrio................... | 141/242X |
| 3,105,525 | 10/1963 | Boucher.................... | 141/91X |
| 3,265,251 | 8/1966 | Lense...................... | 222/168.5 |
| 3,339,595 | 9/1967 | Pechmann.................. | 141/67X |

*Primary Examiner*—Laverne D. Geiger
*Assistant Examiner*—Edward J. Earls
*Attorneys*—Guido Modiano and Albert Josif ABSTRACT: A machine with volumetric dispensers for dispensing predetermined amounts of powdered or granular product into containers by means of said volumetric dispensers, comprising means defining an annular and upwardly open reception space rotating about a vertical axis, a hopper for feeding the product into said reception space, a support for the volumetric dispensers a vertical shaft surrounded by said reception space and allowing rotation of said support thereabout and causing the dispensers to move along a circular path at least partly overlapping said reception space the dispensers having substantially the same peripheral velocity as the rotating reception space, conveyor means for the containers including a sleeve member rotatable connected with said support and having a platform member with a plurality of peripheral seats for said containers and arranged in alignment with said dispensers.

INVENTOR.
Ernesto Gamberini

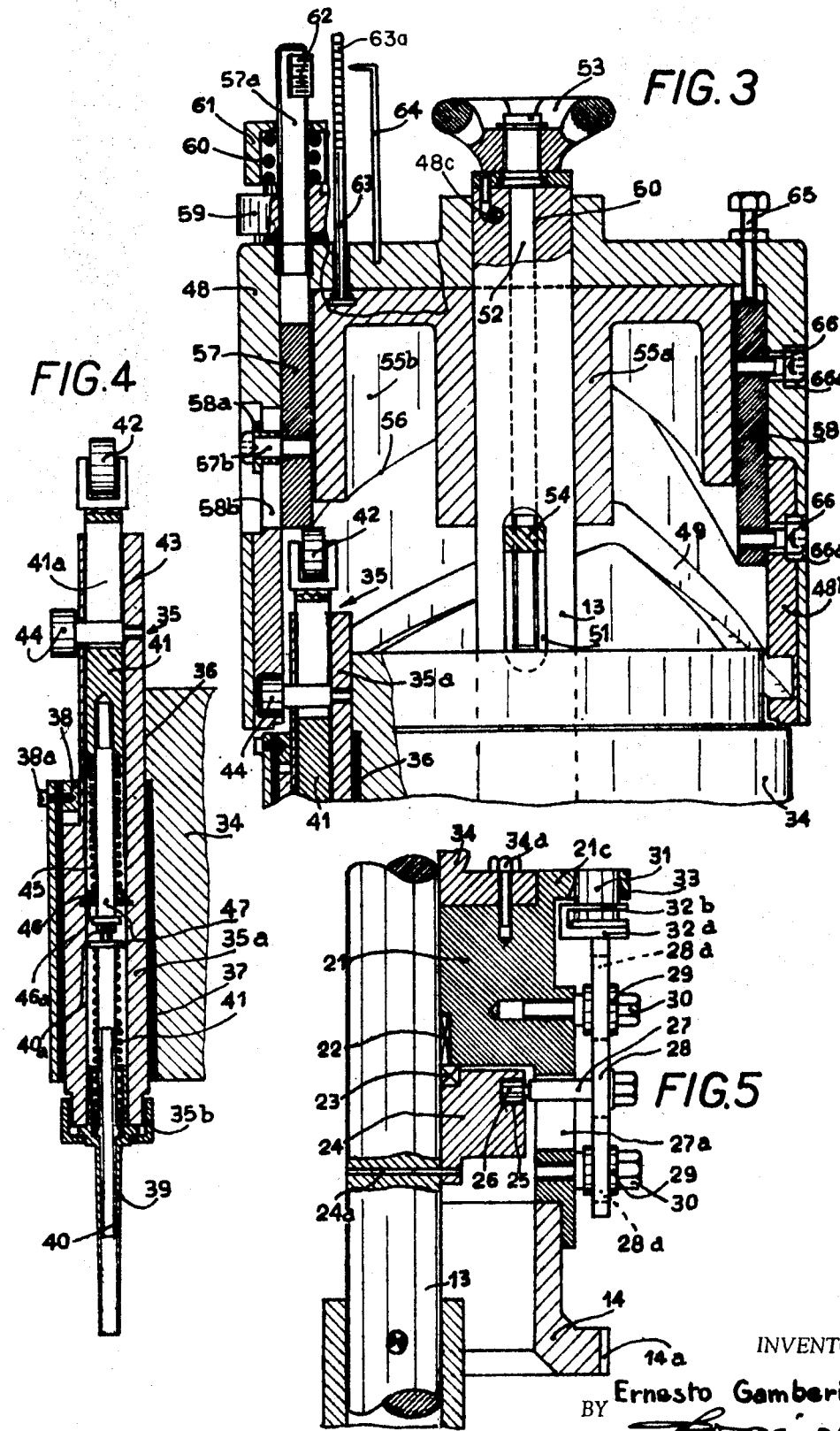

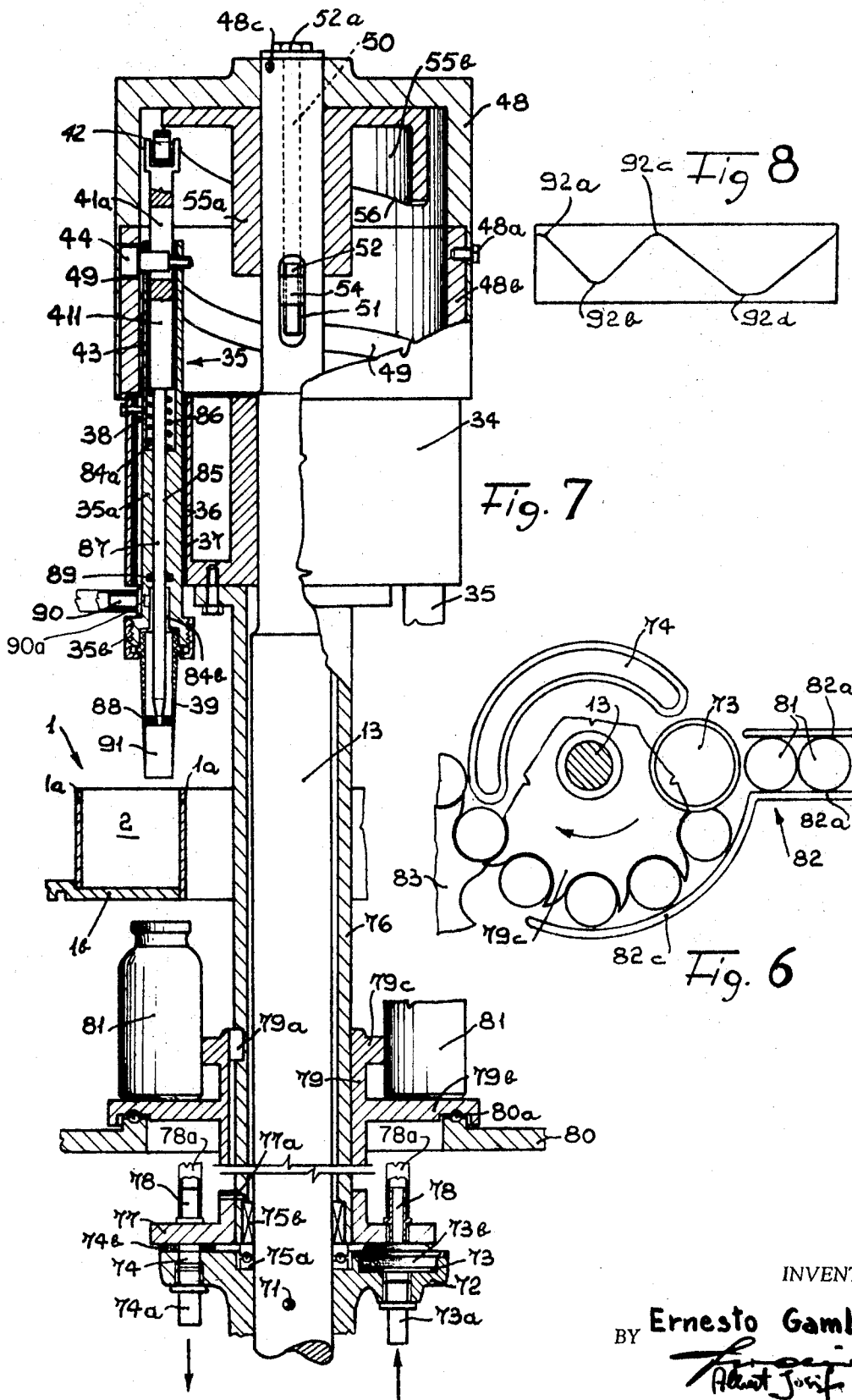

MACHINE FOR DISPENSING PREDETERMINED AMOUNTS OF POWDERED OR GRANULAR PRODUCE IN CONTAINERS BY MEANS OF VOLUMETRIC DISPENSERS

BACKGROUND OF THE INVENTION

The present invention relates to a dispensing machine in which doses of powdered or granular produce are automatically removed from a reception space and, after transfer, dispensed into corresponding packaging containers. More particularly, this invention relates to an automatic continuous dispensing machine, of particular application to the pharmaceutical industry, in which capsules, phials or the like containers are filled with preestablished doses of a produce of the described type.

With reference to said field of use, the known machines designed to perform work of the said kind, sometimes known as dosing machines, usually have an intermittent working. In fact such machines are provided with volumetric dispensers of adequate precision which dispense a determined dose and sometimes compress the product in order to reduce the volume of said dose. In such machines, a plurality of such dispensers are carried by an oscillating support, which is caused to oscillate between a storage hopper and a container conveyor, according to the different operative phases of removal, transfer and filling. In the known machines, the occurrence of various of said operative phases during dwell conditions of the relative apparatus involves a high incidence of dead time in the machine cycle, which evidently reduces the hourly efficiency of the machine.

It is known that, due to the structure of transfer members of the oscillating support type, the presently employed machines necessitate the use of high precision truing or centering means in order to ensure the exact dispensing of the product into the corresponding capsules or phials.

Known dispensing machines are subject to the important disadvantage that it is very difficult and laborious to vary the dosage dispensed by the dispensers, as is frequently required during different working times or for different types of product etc. This is due to the fact that it is necessary to set or meter each of the dispensers individually to the desired dosage, and then check in order to ensure the uniformity of the doses distributed by each of the dispensers of the series.

SUMMARY OF THE INVENTION

The main object of this invention is that of overcoming such difficulties by providing an automatic dispensing machine of the described type which works in continuous manner with a high work rate.

Another object of the invention is that of providing a dispensing machine in which it is possible to ensure that the dose dispensed by each of the single dispensers of the machine is constant, and vary such dose according to desire, by means of a single rapid adjustment operation, thus avoiding prolonged setting and adjustment operations.

A further object of the invention is that of providing a dispensing machine in which the centering or truing of the dispenser members with the reception or container members is ensured by the design of the machine.

A further object of the invention is that of providing a dispensing machine for use in the pharmaceutical industry and which is completely suitable to deal with products which necessitate special attention, such as antibiotics.

A still further object of the invention is that of providing a dispensing machine in which the various parts may be rapidly and easily demounted in order to enable an efficient cleaning of the machine, such cleaning being of notable importance in the case of products of the described type.

Another object of the invention is that of providing a dispensing machine which is of simple structure, ready manufacture and sure, efficient and economic working.

According to the invention there is provided a dispensing machine comprising a plurality of volumetric dispensers, a reception space for the produce to be dispensed, a rotatable support for a series of said dispensers arranged for continuous movement relative to said reception space, said support being provided with a plurality of seats for the arrangement of said dispensers, transport means for receiving a plurality of containers and cooperating with said support, cyclic cam means for actuating said dispensers, removal and discharge members for said containers, and container loading and unloading means for said transport means.

BRIEF DESCRIPTION OF THE DRAWINGS

Further characteristics and advantages of the invention will appear more clearly from the following detailed description of two preferred embodiments of a dispensing machine according to the invention, illustrated by way of example in the accompanying drawings in which:

FIG. 3 is an axial section elevation view of the upper part of the machine relative to the actuation means of the dispensers;

FIG. 4 is an axial section view of one dispenser;

FIG. 5 is a partially sectioned elevation view of a detail of FIG. 1;

FIG. 6 is a partially sectioned and diagrammatic plan view of the lower parts of a dispensing machine according to the invention for the dispensing of products which have to be treated with particular attention, such as antibiotics;

FIG. 7 is an axial section partly in elevation of the dispensing machine of FIG. 6; and FIG. 8 shows a plan development of the contour of cam means employed in the dispensing machine FIG. 6.

DESCRIPTION OF THE PREFERRED EMBODIMENTS

Figure 1:
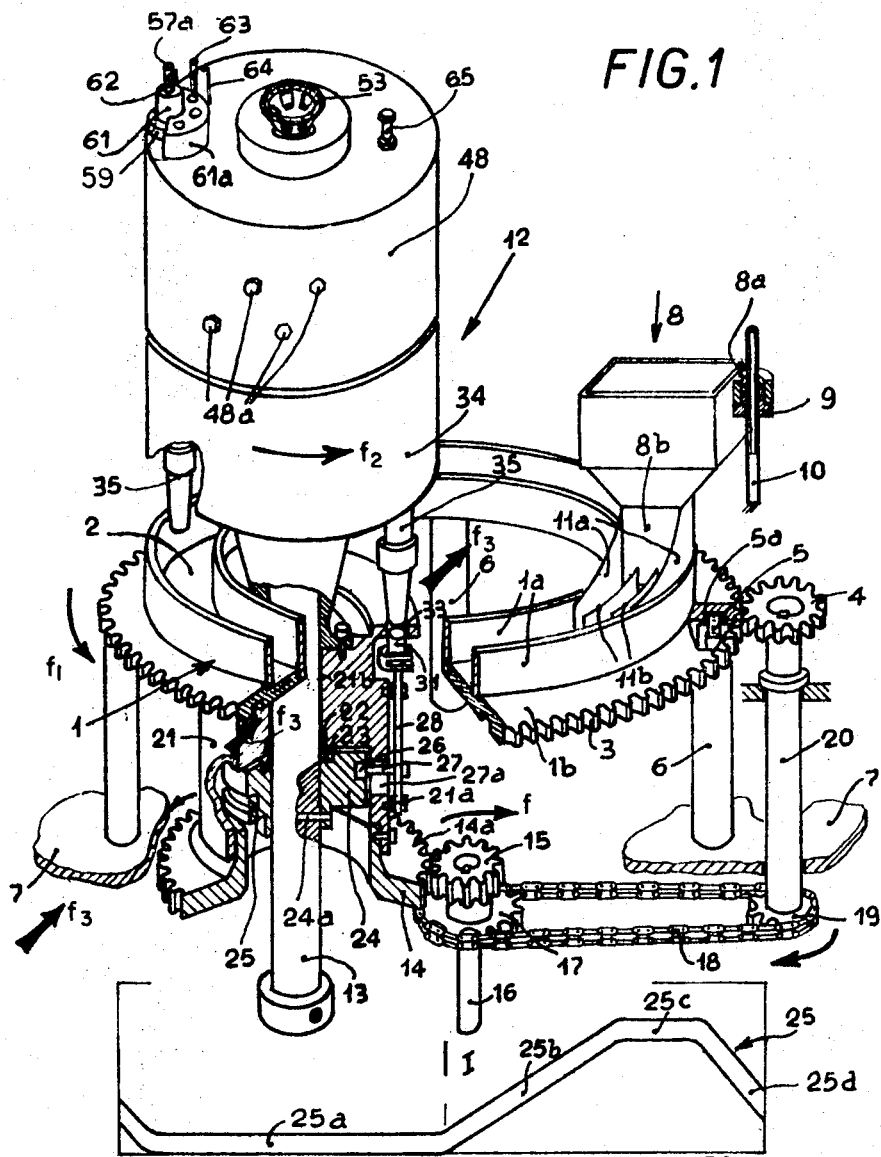
FIG. 1 is a partially sectioned perspective view of a machine according to the invention.

With reference to the FIGS. and particularly to FIG. 1, the dispensing machine according to the invention comprises a hopper 1 formed by a vertical axis ring bounded by a pair of sidewalls 1a and plane base 1b. Between said walls 1a there is defined an upwardly open annular reception space 2 which is designed to receive powdered or granular or particulated produce. Said base 1b is provided with an externally toothed edge 3 which is arranged to mesh with a cog wheel 4. The base 1b is slidably supported on a plurality of pillar members 6, rigid with the base 7 on the machine, by means of rollers 5 which are arranged to be engaged in an annular groove 5a provided in the lower surface of said base 1b. The arrangement is such that the hopper 1 may rotate about its own axis in the direction of the arrow $f_1$.

Above said hopper 1 is arranged a product feed hopper 8 which is provided in its lower section with a funnel 8b arranged to extend into said reception space 2.

The height of said feed hopper 8 may be adjusted by screw means in order to enable control of the amount of product in said hopper 1. The external side of said feed hopper 8 is provided with a lug 8a having a through hole which is designed to rotatably house a sleeve member 9. Said sleeve member 9, which is provided at its lower end with a stop and support shoulder for said feed hopper 8, is screwed on a shaft 10 which is designed to support said feed hopper 8 and is rigid with said base 7 of the machine. Said funnel 8b is provided with an arrangement of arcuated laminar elements 11a and 11b which extend within said reception space 2 in the opposite direction to the sense of rotation of said hopper 1. Said laminar elements 11a are arranged adjacent the walls 1a of said hopper 1 and are designed, during the rotation of the hopper 1, to scrape off any product adhering to said walls 1a. Said laminar elements 11b are arranged between the elements 11a and are designed to break up and uniformly distribute the product within the reception space 2.

The dispensing machine further comprises a support mechanism or conveyor 12 for supporting a plurality of dispensers generally indicated at 35 in FIG. 1, which includes a rotary unit arranged to rotate about a vertical shaft 13 in the direction of the arrow $f_2$. Said shaft 13 is arranged eccentric with respect to the axis of rotation of said hopper 1, on the side opposite said feed hopper 8. As visible from FIG. 1 a portion of the circular trajectory of the dispensers 35 is tangential, in a plan view, with the annular reception space 2.

Said rotary unit firstly comprises a sleeve member 14 arranged coaxially with said shaft 13 and having an externally toothed surface 14a which meshes with a cog wheel 15 keyed on a shaft 16. The lower end of said shaft 16 is coupled in known manner to driving means (not shown). On said shaft 16 is also keyed a driving sprocket wheel 17 for a flexible chain 18 which is also wound about a driven sprocket wheel 19. Said sprocket wheel 19 is keyed on a shaft 20 to which said cog wheel 4 which drives the hopper 1 is mounted. The various transmissions have ratios such that the dispensers 35 and the hopper 1 have the same peripheral velocity.

Said sleeve member 14 is connected by means of screws 21a to a tubular member 21 having an axial bore 21b through which said shaft 13 is arranged to pass. Between said sleeve member 14 and said tubular member 21 are provided roller and ball bearing means, 22 and 23 respectively, said bearing means being arranged between the base of said tubular member 21 and a member 24 of a cam mechanism.

Said member 24 comprises an annular cylindrical member which is rigidly connected to said shaft 13 by means of a peg 24a. Said member 24 is provided with an endless groove 25 which forms a guide for one of a plurality of rollers 26 engaged therein, during relative motion between said tubular member 21 and said member 24. Said rollers 26 are rotatably mounted on relative pins 27 arranged in equispaced relationship in peripheral slots 27a provided in said tubular member 21.

Each pin 27 is connected to a relative rodlike member 28 and determines the displacement of the latter parallelly to said shaft 13. Such rodlike member 28 is guided during its translation or displacement relative to the tubular member 21 by means of grooved rollers 29 (FIG. 5). Said rollers 29 are mounted on said tubular member 21 by means of screws 30 and engage in prearranged corresponding slots 28a longitudinally formed in said rodlike members 28. The upper end of each of said rodlike members 28 is designed to enable the arrangement of a container or a support seat for a container, said containers being diagrammatically indicated at 31.

In such zone, above the support plane 32a is parallelly derived the fork 32b which opens outwardly and radially. The engagement of the containers 31 on—and the disengagement thereof from—the rods 28, i.e. the fork 32b will occur when such containers arrive, during the rotation about the shaft 13, in determined angular positions. In practice this will occur when two opposite containers 31 assume the same alignment (as illustrated by the arrows $f_3$ in FIG. 1). The feeding and discharging of said containers 31 is effected, for instance, by known rotating distributors with suitably shaped teeth, not shown in the drawing for the sake of clarity. The unit formed by said tubular member 21 and the rods 28 consequently constitutes a conveyor for said containers 31.

The tubular member 21, which is provided in its upper section with a band or platform member 21c which is arranged above. Provided coaxial with the axis of translation of said rods 28, are corresponding through holes 33 of the flange 21c. Said through holes or lodgements 33 are designed to receive part of said containers 31 and ensure the centering or truing of the latter, the lower ends of said through holes 33 being shaped with a taper to allow the insertion of said containers 31. The lower end of a drum 34 is connected to said tubular member 21 by means of screws 34a. The drum 34 can freely rotate about said shaft 13 and forms the support means for the volumetric dispensers 35, which predetermine the dosage dispensed. The number and the angular and peripheral arrangement of said dispensers 35 exactly correspond to the arrangement of said rods 28. The dispensers 35 are arranged in seats or grooves housings 36, which are open at both ends thereof, extend parallel to the axis of said drum and are located near the periphery of said drum 34 in manner such as to have the same axes as said through holes 33.

Each dispenser 35 (FIG. 4) comprises an external substantially tubular casing or envelope 35a. The upper end of such envelope 35a is open, whilst the lower end is closed by means of a cap nut 35b which is screwed thereto. Said envelope 35a is guided in the seats 36 and projects beyond the lower end thereof. Sliding bush means 37 of known self-lubricating type are interposed between said envelope 35a and said seat 36 in order to provide a packing or seal. Each bush 37 is fixed in said seat 36 by means of screws 38a which are also connected to prismatic or spline members 38 of known type engaged to the envelope 35a. In this manner relative rotation between the envelope 35a and the seat 36 is prevented. Said cap nut 35b is centrally bored and forms a stop for a tubular syringe or injector member 39 which is inserted in the lower end of said envelope 35a and is retained between said envelope and said cap nut 35b. Said injector member 39 extends below said cap nut 35b with a slight external taper. Arranged inside said injector member 39 is a piston rod 40 (FIG. 4) which is urged upwards by a return spring 41 housed in the upper seat of said member 39 and interposed between the latter and a stop provided on said piston rod 40. At the upper end of said piston rod 40 there are provided screw adjustment means 40a in engagement therewith. Arranged in the upper portion of said envelope 35a is a further rod 411, the upper end of which extends beyond said envelope and is forked. Said forked upper end of the rod 411 is designed to support a roller 42.

Said rod 411 is guided within said envelope 35a with the interposition of bush members 43 which are completely similar to said bush 37. The rod 411 is provided with a through slit 41a in which a pin screwed to said envelope 35a is inserted and a roller 44 is mounted on such pin.

The lower end of said rod 411 is provided with a seat which is designed to house a spring 45 which is in abutting engagement with the bottom of said seat and a stop ring 46. Said stop ring 46 is maintained at a determined height within the envelope 35a by means of an extensible ring 46a.

Said spring 45 is mounted on and in engagement with a stem 47 which is connected to said rod 40 and which, passing through the rings 46 and 46a, tends to downwardly displace said piston rod 40, said stem 47 being in abutting engagement with said adjustment screw 40a.

On the upper end of said shaft 13 a tubular or bell-like member 48 is keyed by means of peg 48c, said tubular member 48 being arranged to cover said dispenser support 34.

A sleeve member 48b (FIG. 3) is inserted in said tubular member 48 and is secured thereto by means of screws 48a (FIG. 1). Said band sleeve member 48b is provided with an endless groove 49 in which said roller 44, which actuates said envelope 35a, is engaged.

The upper end of said shaft 13 is further provided with a cylindrical axial seat 50 whose lower end terminates in a transverse through slit 51. In said seat 50 is rotatably engaged a stem 52 which may be rotated by means of a handwheel 53 connected thereto. The lower end of said stem 52 is embedded in a block 54 which is slidably arranged in said slot 51.

The portion of said block 54 projecting externally of said slot 51 is connected to a double sleeve member 55a which may reciprocate along said shaft 13. Said double sleeve member 55a has a cylindrical portion 55b which is arranged coaxial with said shaft 13. There is provided an interspace between the portion 55b and said tubular member 48, said portion 55b being arranged to follow the movement of the latter.

The lower edge said cylindrical portion 55b is provided with a guide profile or track 56 in which the internal said of said roller 42 is engaged in a camlike arrangement. In the angular dose removal and expulsion position, said roller 42 is caused to follow, due to action on its external side, the shaped edges of further cam members indicated by reference numerals 57 and 58 respectively. The terms "internal" and "external" side of said roller 42 are intended to indicate the sides of the roller 42 turned towards the axis of said drum 34 and away from said axis, respectively. Said cam members 57 and 58 are arranged to extend within said interspace between said tubular member 48 and said cylindrical portion 55b.

Said cam member 57 is upwardly provided with a tang 57a, which passes through a hole provided in the top of said bell-like member 48, and is downwardly provided with a screw 57b which passes through a bush 58a which is engaged in axial bores 58b provided in said tubular member 48.

The level of said cam member 57 may be adjusted by means of a knurled ring 59 which is in screw thread engagement with said tang 57a. Said cam member 57 is spring-loaded by means of spring means 60 arranged between a cap member 61 and said ring 59. Said cap member 61 is provided with a flange member 61a (FIG. 1 secured) to said tubular member 48 inside which said tang 57a is inserted.

The reciprocal position between the cam member 57 and the cylindrical portion 55b is also ensured by members which will now be described. The end of said tang 57a is provided with a scale 62, and is arranged adjacent a scale 63a of a rod 63 which is connected to said cylindrical portion 55b and which projects externally of a through hole provided in the top of said bell-like member 48. Said scales 62 and 63a are referred to a pointer 64 which is rigidly attached to said tubular member 48. While said cam member 57 has a relatively wide range of adjustment, the level of the other cam member 58 is relatively limited. In fact the adjustment of said cam member 58 is determined by a screw 65 which is screwed to the top of said bell-like member 48 and which engages the top of said cam member 58. The adjustment in height of said cam member 58 is permitted due to the play allowance of locking screws 66 which engage said cam member 58 in lateral through holes 66a provided in said tubular member 48.

Because of the nature of products which it is desired to dispense it will be necessary to provide a seal cover (not shown but readily intuitable) secured to the base 7 of the machine.

Figure 2:
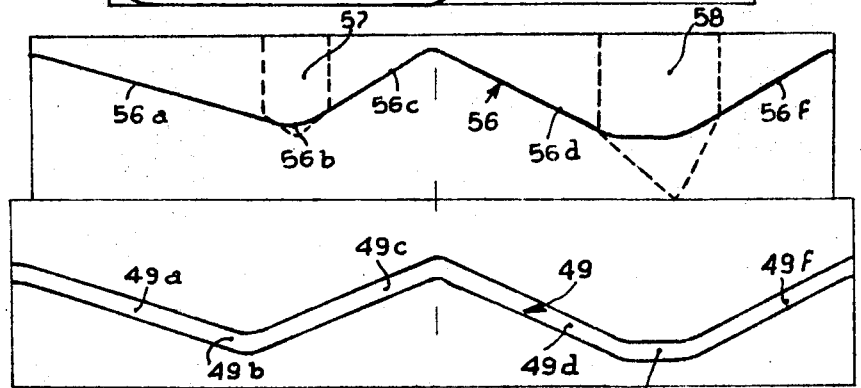
FIG. 2 shows the plan development of cam means employed in the machine according to FIG. 1.

The working of the dispensing machine according to the invention will now be explained with particular reference to FIG. 2, which shows the plan development of the grooves 25 and 49 and of the cams 55b 57 and 58. Said cam means are stationary with respect to the support conveyor 12 and tubular member 21, which are mounted for rotation around shaft 13 and the hopper 1, which is offset mounted with respect to the latter.

Suppose that a dispenser 35 is above the reception space 2 for the product, its envelope 35a actuated by the engagement of the roller 44 in the portion 49a of the groove 49 begins its descending stroke and introduces the syringe 39 in the product. Said stroke terminates adjacent the portion 49b of said endless groove 49, so that the lower edge of the syringe touches on the basis 1b of the hopper 1. Subsequently said envelope 35a rise along the portion 49c of said groove 49 in order to pass over said sidewall 1a of the hopper 1. The roller 44 passes then along the groove portion 49d, causing the envelope to descend, in order to enter the corresponding hole 33 adjacent the portion 49e for the insertion of the product in the container 31. The envelope then rises along the groove portion 49f in order to pass again over the sidewall 1a of the hopper 1. At this point the preceding steps are cyclically repeated.

Since the cam profile 56 is concentric with and identical to said endless groove 49 and has portions 56a to 56f which correspond to the portions 49a to 49f, it will be clear that the piston unit formed by 411–42–40 assumes the same angular positions, in the same times, as said envelope 35a.

Adjacent the partition 56b of said cam 55b the projecting cam member 57 actuates said roller 42 and according to work requirements, causes the compression of the product which is enclosed in the syringe member 39. The cam member 58, which also has a shaped projecting edge, instead determines a greater lowering of the piston unit 411–40–47 with respect to the envelope, in order that said piston unit may reach the outlet entrance of said syringe 39 for the insertion of product into the container 31.

During the compression of the product the rodlike member 28 is at its downward stroke limit and the roller 26 engages the portion 25a of the groove 25. When the compressed product has to be inserted in the container 31, then the roller 26 runs along the portion 25c and reaches the top limit 25c at which the container 31 is immediately under the syringe 39. After receiving the compressed product, the roller 26 passes through the groove portion 25d and the proceeding steps are then cyclically repeated.

FIG. 6 to 8 show another embodiment of the dispensing machine according to the invention. In such FIGS. parts already described in relation to FIGS. 1 to 6 retain the same reference numerals.

With reference to FIGS. 6 to 8, the dispensing machine according to the invention comprises the hopper 1 with the sidewalls 1a and the base 1b which define the reception space 2. Said reception space 2 is designed to receive loose product, such as an antibiotic. Said hopper 1 is arranged eccentric with respect to said shaft 13 and is driven by means of its toothed base (not shown). A support 72 is connected to the lower portion of said shaft 13 by means of a peg 71. Said support 72 is provided with upwardly open apertures 73 and 74 which communicate, through unions 73a and 74a and relative pipes connected thereto, with a compressed air source and suction means (not shown), respectively. Inside said apertures 73 and 74 annular seal rings 73b and 74b are arranged, which project upwardly up to the same level. Said aperture 74 (FIG. 6) extends over an arc of a circle the center of which lies on the center line of said shaft 13, the center of the aperture 73 lying on said circle. In other words the fixed support 72 has apertures 73 and 74 substantially arranged along a common circular ring. Since such seal rings 73b, 74b have an upper horizontal flat surface lying in the same plain these surfaces remain in constant contact with the lower flat surface of the disc 77.

Above said support 72, a tubular element 76 is arranged between thrust bearings 75a and guide bushes 75b, which may freely revolve on said shaft 13. On the bottom end of said tubular element 76 a flanged ring 77 is secured by means of pins 77a. A number of axial holes, equal to the number of dispensers 35, are provided in said ring 77. Flexible pipes 78a are connected to unions 78 which are connected to said holes 73 and 74.

Above said support 72 a conveyor is provided which is formed by a sleeve member 79, connected (by means of a key 79a) to said tubular element 76, and by a support shelf 79b, supported by means of interposed bearings 80a, on the fixed thrust plate 80.

Above said support shelf 79b, said sleeve 79 carries a toothed crown 79c. The teeth of said crown 79 are shaped so as to receive and engage phials 81 fed at 82 (FIG. 6) between guides 82a. Said phials 81, supported by said support shelf 79b and guided along an arcuate guide 82c, remain at a level lower that that of said hopper 1 and are transferred by the wheel 79c (rotating in the sense of the arrow shown in FIG. 6) to the zone of action of a removal wheel 83.

Said apertures 73 and 74 are arranged on a circular arc diametrically opposite to said arcuate guide 82c. The elongated and arcuated aperture 74 extends from said removal wheel 83 up to near the feed 82, while the aperture 73 is arranged in front of said feed 82.

Said sleeve member 79 is provided with a toothed wheel driven, together with said hopper 1, by driving means analogous to that shown in FIG. 1.

Screw means (not shown) connect the flanged upper end of said tubular element 76 to the drum 34 which is free to rotate about the shaft 13 and which is peripherally provided with axial through seats 36 for the sliding of said dispensers, generally indicated at 35. Said drum 34 is covered by said tubular member 48 which is secured to said shaft 13 by means of a peg 48c. As previously pointed out, at the lower end, and internally, of said tubular member 48 is arranged a hollow-cylinder 48b which is provided with an endless groove 49.

As already described in relation to the embodiment of the dispensing machine according to the FIGS. 1—5, the shaft 13 is further provided with the upper axial seat 50 which terminates in the transverse through slot 51. The block 54, to which the threaded end of a stem 52 is screwed, is arranged to slide in said slot 51. The stem 52 is rotatably arranged in said seat 50 and is provided at its free end, externally of said tubular member 48, with a nut 52a. The terminal zone of said block 54 projecting from said shaft 13 is connected to a sleeve member 55a (which is, consequently, also displaceable along said shaft 13) which has a cylindrical portion 55b coaxial with said shaft 13 and with a guide contour 56, similar to said groove 49.

Each dispenser 35 comprises an envelope 35a with seats 84a and 84b at the two ends, said seats 84a and 84b being arranged to communicate with each other through an axial channel 85. Said envelope 35a extends beyond the top and bottom of its relative seat 36 to which it is connected by means of a key 38, with the interposition of sliding bush members 37. The syringe 39 is maintained in position by said envelope through the cap nut 35b. Said syringe 39, which has a top to bottom tapering is advantageously formed of a material which has a low coefficient of friction and which is relatively inert in the chemical sense. A material known under the commercial name Teflon satisfies these conditions and is especially suitable for use with antibiotic products.

Inside the seat 84a is arranged, with the interposition of bushes 43, a rod 411. Said rod 411 is provided with a transverse slit 41a through which a pin is screwed to said envelope 35a and laterally bears the roller 44. Said roller 44 engages in said endless groove 49 defining the strokes of the envelope 35a.

The upper end of said rod 411, beyond the upper end of said envelope 35a, is forked and rotatably supports a roller 42. Said roller 42 is maintained in pressure contact with said guide contour 56 by a spring 86 which is interposed between a step of said rod 411 and the bottom of the seat 84a.

The lower end of said rod 411 extends in the form of a stem 87 which is arranged in the seats 85 and 84a and which carries a piston 88 at its lower end. Said piston 88 is composed of material, such as sintered material. Said stem 87 is sealed within the channel 85 due to the presence of the seal ring 89. Adjacent said seat 84b, said envelope 35a is provided with a radial aperture 90a for the insertion of a union 90. Said union 90 communicates, through a flexible tube and suitable passages provided in sleeve member 79, as well as through the central aperture of the hopper 1 with the corresponding union 78.

It will be clear that, due to the profiles of the two cams 55b, 49 (FIG. 8), the working of the machine will ensure that (once the capacity of the dispensing cavity 91 is defined in relation to the axial position of the cam 56) each dispenser, in which the piston and the envelope reciprocate, rises at 92a over the inner wall 1a of said hopper 1 and terminates the downward stroke at 92b in the reception space 2 for the product. When the syringe 39 is lowered until its lower edge lies at an appropriate distance from the base 1b, the union 78 enters in communication with the suction means through the aperture 74 and the product is sucked into the cavity 91 since the latter is connected with the union 78 through the porous piston 88, the radial aperture 90a and the flexible tube joined to the union 90. During the further rotation about the shaft 13, the dispenser rises again and at 92c gets over the inner sidewall 1a and descends consequently on to the phials below. During this travel the product is held by suction in the cavity 91 since the union 78 moves over the arcuated aperture 74 and the suction action persists.

When the union 78 has reached the aperture 73, the syringe 39 is penetrated at 92d into a phial 81 engaged by the toothed crown 79c. At the same time the union 78, which has abandoned the aperture 74, enters in communication with the compressed air source through the aperture 73 in order to eject the product contained in the cavity 91 into said phial.

The ejection of the product from the cavity 91 is helped by moving the piston 88 downwards with respect to the syringe 39. In this way eventual particles of product attached to the inner surface of the cavity may be removed. Afterwards the dispenser rises again to cross over the inner wall 1a, recommencing the cycle as described.

I claim:

1. A machine with volumetric dispensers having a dispensing mechanism for dispensing predetermined amounts of particulated produce into containers by means of said volumetric dispensers, comprising means defining an annular and upwardly open reception space rotating about a vertical axis, said annular reception space having an inner periphery thereof delimiting a central zone, a hopper for feeding the produce into said reception space, a rotating support mechanism for said volumetric dispensers, a vertical shaft surrounded by said reception space, said vertical shaft supporting said support mechanism and allowing rotation thereof together with said volumetric dispensers about said vertical shaft thereby defining a circular path of said volumetric dispensers, said path having a first section thereof lying above an arc of said annular reception space and a second section thereof extending over said central zone, said volumetric dispensers having during rotation a peripheral velocity substantially equal to the peripheral velocity of said means defining said reception space, conveyor means for said containers including a sleeve member rotatably connected with said support mechanism and having a platform member with a plurality of peripheral lodgements for said containers and arranged in alignment with said dispenser, wherein according to the improvement, said support mechanism includes a drum having a plurality of peripherally spaced seats for said dispensers, said seats guiding and allowing a relative motion of said dispensers with respect to said seats in a direction parallel to said vertical axis, said seats in a direction parallel to said vertical axis, said seats being arranged above said reception space, said platform member being arranged below said reception space, first cam means for alternatingly moving said dispensers in said vertical direction downwards into said reception space and upwards away from said reception space when said dispensers reach said first section of their circular path and again downwards towards said containers and upwards away from said containers when said dispensers reach said second section of their circular path, and second cam means connected with said dispensing mechanism for actuating said dispensing mechanism to effect dispensing when said dispensers reach said second section of their circular path.

2. A machine according to claim 1, wherein each of said dispenser comprise an envelope axially guided in said seats of the drum, a downwardly open syringe mechanism secured on the lower end of said envelope, a first roller supported on said envelope and having a roller axis extending in a direction radial to said vertical shaft, a first sleeve member in said support mechanism having a groove cam defining said first cam means in actuating engagement with said roller, a piston slidably in said syringe mechanism and having a piston rod, a second roller on said piston rod and having its roller axis extending in said radial direction, a second sleeve member in said support mechanism having a cam profile defining said second cam means in actuating engagement with said second roller, the shape of said first and said second cam means being such that said syringe mechanism is lowered into said reception space when the dispensers reach said first section of their circular path, and at the same time said piston is actuated to take the produce therefrom, and the syringe mechanism is again lowered when said dispensers reach their position of alignment with said containers and at the same time the said piston is actuated to eject the produce from the syringe mechanism into said containers.

3. A machine according to claim 2, wherein said piston rod includes a porous sector defining a dispensing cavity in said syringe mechanism, said envelope having passage openings communicating alternatively with pneumatic suction and compression source in order to introduce or to expel the produce in or from said cavity, the shape of said second cam means engaging said second roller on said piston rod being such that the piston rod moves with respect to the envelope only during the expulsion of produce into said containers.